US012595863B2

(12) United States Patent
Yoshida et al.

(10) Patent No.: US 12,595,863 B2
(45) Date of Patent: Apr. 7, 2026

(54) ELECTRIC VALVE

(71) Applicant: FUJIKOKI CORPORATION, Tokyo (JP)

(72) Inventors: Tatsuya Yoshida, Tokyo (JP); Yusuke Arai, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 18/841,577

(22) PCT Filed: Mar. 27, 2023

(86) PCT No.: PCT/JP2023/012083
§ 371 (c)(1),
(2) Date: Aug. 26, 2024

(87) PCT Pub. No.: WO2023/203967
PCT Pub. Date: Oct. 26, 2023

(65) Prior Publication Data
US 2025/0164027 A1     May 22, 2025

(30) Foreign Application Priority Data

Apr. 21, 2022     (JP) ................................. 2022-070399

(51) Int. Cl.
*F16K 31/04*          (2006.01)
*F16K 31/50*          (2006.01)
*F16K 37/00*          (2006.01)
(52) U.S. Cl.
CPC .......... *F16K 31/046* (2013.01); *F16K 31/047* (2013.01); *F16K 31/50* (2013.01);
(Continued)
(58) Field of Classification Search
USPC .................................................. 251/129.11
See application file for complete search history.

(56) References Cited

U.S. PATENT DOCUMENTS 5,316,263 A       5/1994   Mino et al.
6,561,480 B1 *   5/2003   Komiya ................ F25B 41/347
                                                              251/129.05
(Continued)

FOREIGN PATENT DOCUMENTS

EP          1760875 A1      3/2007
JP          S63-34385 A     2/1988
(Continued)

OTHER PUBLICATIONS

International Search Report, mailed Jun. 13, 2023, issued for the corresponding International patent application No. PCT/JP2023/012083, with English translation, 5 pages.
(Continued)

*Primary Examiner* — Matthew W Jellett
(74) *Attorney, Agent, or Firm* — LUCAS & MERCANTI, LLP

(57)          ABSTRACT

An electric valve includes a valve body that has a valve port and a valve seat enclosing the valve port, a valve member that faces the valve port, a valve stem, and a stepping motor. The valve stem has an external thread. The valve body has an internal thread into which the external thread is screwed. The external thread and the internal thread constitute a screw-feed mechanism. The valve stem is coaxially secured to a magnet rotor of the stepping motor. The lower end of the valve stem is connected to the valve member. When the magnet rotor rotates in a valve closing direction, the valve member moves toward the valve port. When the valve member comes into contact with the valve seat, the valve member is restricted from moving toward the valve port.

8 Claims, 9 Drawing Sheets

(52) U.S. Cl.
CPC .......... *F16K 31/504* (2013.01); *F16K 31/508*
(2013.01); *F16K 37/0041* (2013.01)

(56) References Cited

U.S. PATENT DOCUMENTS

| | | | | |
|---|---|---|---|---|
| 8,851,448 | B2 * | 10/2014 | Harada | F16K 31/53 |
| | | | | 251/85 |
| 10,234,056 | B2 * | 3/2019 | Kawamura | F16K 31/042 |
| 10,267,434 | B2 * | 4/2019 | Mitsu | F16K 47/04 |
| 10,352,475 | B2 | 7/2019 | Uehara et al. | |
| 10,982,792 | B2 * | 4/2021 | Uehara | F16K 31/08 |
| 11,378,199 | B2 * | 7/2022 | Arai | F16C 17/08 |
| 11,496,036 | B2 * | 11/2022 | Kawada | H02K 7/116 |
| 11,555,637 | B2 * | 1/2023 | Wang | F16K 31/04 |
| 11,692,638 | B2 * | 7/2023 | Adams | F16H 25/20 |
| | | | | 251/129.11 |
| 11,698,146 | B2 * | 7/2023 | Zhang | F25B 25/005 |
| | | | | 29/832 |
| 11,846,455 | B2 * | 12/2023 | Chen | F25B 41/35 |
| 11,906,064 | B2 * | 2/2024 | Yoshida | B29C 66/24249 |
| 11,913,565 | B2 * | 2/2024 | Hosoya | F16K 31/50 |
| 12,234,923 | B2 * | 2/2025 | Yoshida | H02K 5/225 |
| 12,379,033 | B2 * | 8/2025 | Zhang | F16K 31/004 |
| 2006/0071190 | A1 * | 4/2006 | Pfister | F16K 31/047 |
| | | | | 251/129.11 |
| 2008/0067464 | A1 | 3/2008 | Arai et al. | |
| 2016/0290525 | A1 * | 10/2016 | Hotta | B60H 1/00921 |
| 2025/0198534 | A1 * | 6/2025 | Arai | F25B 41/35 |

FOREIGN PATENT DOCUMENTS

| | | | |
|---|---|---|---|
| JP | H05-256544 | A | 10/1993 |
| JP | H8-4931 | A | 1/1996 |
| JP | 2001-12633 | A | 1/2001 |
| JP | 2008-101765 | A | 5/2008 |
| JP | 2013-96388 | A | 5/2013 |
| JP | 2018-179133 | A | 11/2018 |
| JP | 2021185325 | A | 12/2021 |

OTHER PUBLICATIONS

Written Opinion of the International Searching Authority, mailed Jun. 13, 2023, issued for the corresponding International patent application No. PCT/JP2023/012083, with English translation, 8 pages.

International Preliminary Report on Patentability, issued on May 2, 2024 for the corresponding International patent application No. PCT/JP2023/012083, with English translation, 10 pages.

Office Action mailed on Nov. 5, 2024 for the related Japanese patent application No. 2024-516148, with English translation, 11 pages.

Office Action, dated Oct. 23, 2025, which was issued for the corresponding Korean Patent Application No. 10-2024-7020280, 9 pages, with English translation.

Office Action, dated Dec. 2, 2025, which was issued for the corresponding Japanese Patent Application No. 2025-002633, 10 pages, with English translation.

Office Action, dated Feb. 17, 2026, which was issued for the corresponding Japanese Patent Application No. 2025-002633, 8 pages, with English translation.

* cited by examiner

ELECTRIC VALVE

CROSS REFERENCE TO RELATED APPLICATION

This Application is a 371 of PCT/JP2023/012083 filed on Mar. 27, 2023 which, in turn, claimed the priority of Japanese Patent Application No. 2022-070399 filed on Apr. 21, 2022, and both applications are incorporated herein by reference.

TECHNICAL FIELD

The present invention relates to an electric valve.

BACKGROUND ART

Patent Literature 1 discloses an example of an electric valve according to the related art. The electric valve is installed in a refrigeration cycle system of an air conditioner. The electric valve includes a valve body, a valve member, and a stepping motor for moving the valve member. The stepping motor includes a magnet rotor and a stator. The magnet rotor rotates in response to pulses input to the stepping motor. The valve member moves along with the rotation of the magnet rotor, which changes the flow rate of fluid (refrigerant) flowing through a valve port of the valve body.

CITATION LIST

Patent Literature

Patent Literature 1: Japanese Unexamined Patent Application Publication 2018-179133

SUMMARY OF INVENTION

Technical Problem

In the electric valve according to the related art, the magnet rotor moves downward while it rotates in a valve closing direction and pushes the valve member toward the valve port via a spring. When the valve member moves downward and comes into contact with a valve seat of the valve body, the valve member is restricted from moving downward, but the compression of the spring enables the magnet rotor to continue rotating in the valve closing direction. In this configuration, a stopper is provided on the magnet rotor, and a position of the magnet rotor when the rotation of the magnet rotor in the valve closing direction is restricted by the stopper is referred to as a reference position.

This stopper does not serve an essential function of the electric valve for controlling fluid and has a comparatively large shape, hindering the size reduction and increasing the manufacturing cost of the electric valve. Furthermore, the time the magnet rotor stops rotating does not coincide with the time the valve member stops moving, which necessitates a complicated position control of the valve member.

Accordingly, it is an object of the present invention to provide an electric valve capable of having a configuration in which a stopper to be provided on a magnet rotor is omitted and of stopping the magnet rotor from rotating when a valve member stops moving.

Solution to Problem

To achieve the object above, an electric valve according to an aspect of the present invention includes a valve body that has a valve port and a valve seat enclosing the valve port, a valve member that faces the valve port, a valve stem, and a stepping motor. The valve stem and the valve body constitute a screw-feed mechanism, or the valve stem and the valve member constitute a screw-feed mechanism. The valve stem is coaxially secured to a magnet rotor of the stepping motor. An end of the valve stem is connected to the valve member. When the magnet rotor rotates in a valve closing direction, the valve member moves toward the valve port. When the valve member comes into contact with the valve seat, the valve seat restricts the valve member from moving toward the valve port.

In the present invention, preferably, the valve stem and the valve body constitute the screw-feed mechanism. Preferably, the valve stem has an external thread, the valve body has an internal thread into which the external thread is screwed, and the external thread and the internal thread constitute the screw-feed mechanism.

In the present invention, preferably, the valve stem and the valve member constitute the screw-feed mechanism. Preferably, the valve stem has an external thread, the valve member has an internal thread into which the external thread is screwed, and the external thread and the internal thread constitute the screw-feed mechanism.

In the present invention, preferably, the valve stem and the valve body constitute the screw-feed mechanism. Preferably, the valve stem has an internal thread, the valve body has an external thread screwed into the internal thread, and the external thread and the internal thread constitute the screw-feed mechanism.

In the present invention, preferably, the valve stem and the valve member constitute the screw-feed mechanism. Preferably, the valve stem has an internal thread, the valve member has an external thread screwed into the internal thread, and the external thread and the internal thread constitute the screw-feed mechanism.

In the present invention, preferably, the valve body has a valve stem hole that is disposed coaxially with the valve port, the internal thread is provided on an inner circumferential surface of the valve stem hole, and the end of the valve stem is integrally connected to the valve member.

In the present invention, preferably, the valve body has a valve stem hole that is disposed coaxially with the valve port, the internal thread is provided on an inner circumferential surface of the valve stem hole, the end of the valve stem is in contact with the valve member, and when the magnet rotor rotates in the valve closing direction, the valve stem pushes the valve member toward the valve port.

In the present invention, preferably, the valve body has a bearing that rotatably supports the valve stem, the bearing is disposed coaxially with the valve port, the valve member has a valve stem hole, and the internal thread is provided on an inner circumferential surface of the valve stem hole.

In the present invention, preferably, the electric valve includes a controller for controlling the stepping motor. Preferably, in an initialization operation mode, the controller rotates the magnet rotor in the valve closing direction and obtains, as a reference position, a position of the magnet rotor when rotation of the magnet rotor in the valve closing direction is restricted, and in a normal operation mode, the controller positions the magnet rotor based on the reference position.

In the present invention, preferably, the controller includes a magnetic sensor that outputs a signal corresponding to the rotation of the magnet rotor, and the controller detects that the rotation of the magnet rotor in the valve closing direction is restricted based on the signal output by the magnetic sensor.

Advantageous Effects of Invention

According to the present invention, the valve stem and the valve body constitute the screw-feed mechanism, or the valve stem and the valve member constitute the screw-feed mechanism. The valve stem is coaxially secured to the magnet rotor of the stepping motor, and the end of the valve stem is connected to the valve member. When the magnet rotor rotates in the valve closing direction, the valve member moves toward the valve port. When the valve member comes into contact with the valve seat, the valve seat restricts the valve member from moving toward the valve port. With this configuration, the screw-feed mechanism constituted by the valve stem and the valve body moves the valve stem and the valve member, or the screw-feed mechanism constituted by the valve stem and the valve member moves the valve member. When the magnet rotor rotates in the valve closing direction, the valve stem also rotates in the valve closing direction. When the valve member comes into contact with the valve seat, the valve seat restricts the valve member from moving toward the valve port, stopping the valve member from moving. Therefore, the screw-feed mechanism is also stopped, restricting the valve stem from rotating in the valve closing direction and stopping the magnet rotor from rotating. As a result, a stopper to be provided on a magnet rotor can be omitted, and the magnet rotor can be stopped from rotating when the valve member stops moving.

According to the present invention, in the initialization operation mode, the controller rotates the magnet rotor in the valve closing direction and obtains, as the reference position, the position of the magnet rotor when the rotation of the magnet rotor in the valve closing direction is restricted. In the normal operation mode, the controller positions the magnet rotor based on the reference position. With this configuration, when the magnet rotor is rotated in the valve closing direction and reaches the reference position, the controller can stop rotating the magnet rotor. Therefore, the rotation of the magnet rotor in the valve closing direction beyond the reference position can be suppressed, which inhibits wear on the valve seat and power consumption. Additionally, when the magnet rotor is rotated in a valve opening direction and reaches a predetermined full-open position, the controller can stop rotating the magnet rotor. Therefore, the rotation of the magnet rotor in the valve opening direction beyond the full-open position can be suppressed, which inhibits the external and internal threads of the screw-feed mechanism from being unscrewed. As a result, a stopper for restricting the rotation of the magnet rotor in the valve opening direction can be omitted, and a coil spring for returning the external and internal threads to being screwed can be omitted.

DESCRIPTION OF EMBODIMENTS

First Embodiment

An electric valve 1 according to a first embodiment of the present invention is described below with reference to FIGS. 1 to 7. For example, the electric valve 1 is installed in a refrigeration cycle system of an air conditioner and operates in response to a command transmitted from a control unit 400 of the air conditioner. The control unit 400 is an external device that is separated from the electric valve 1.

Figure 1:
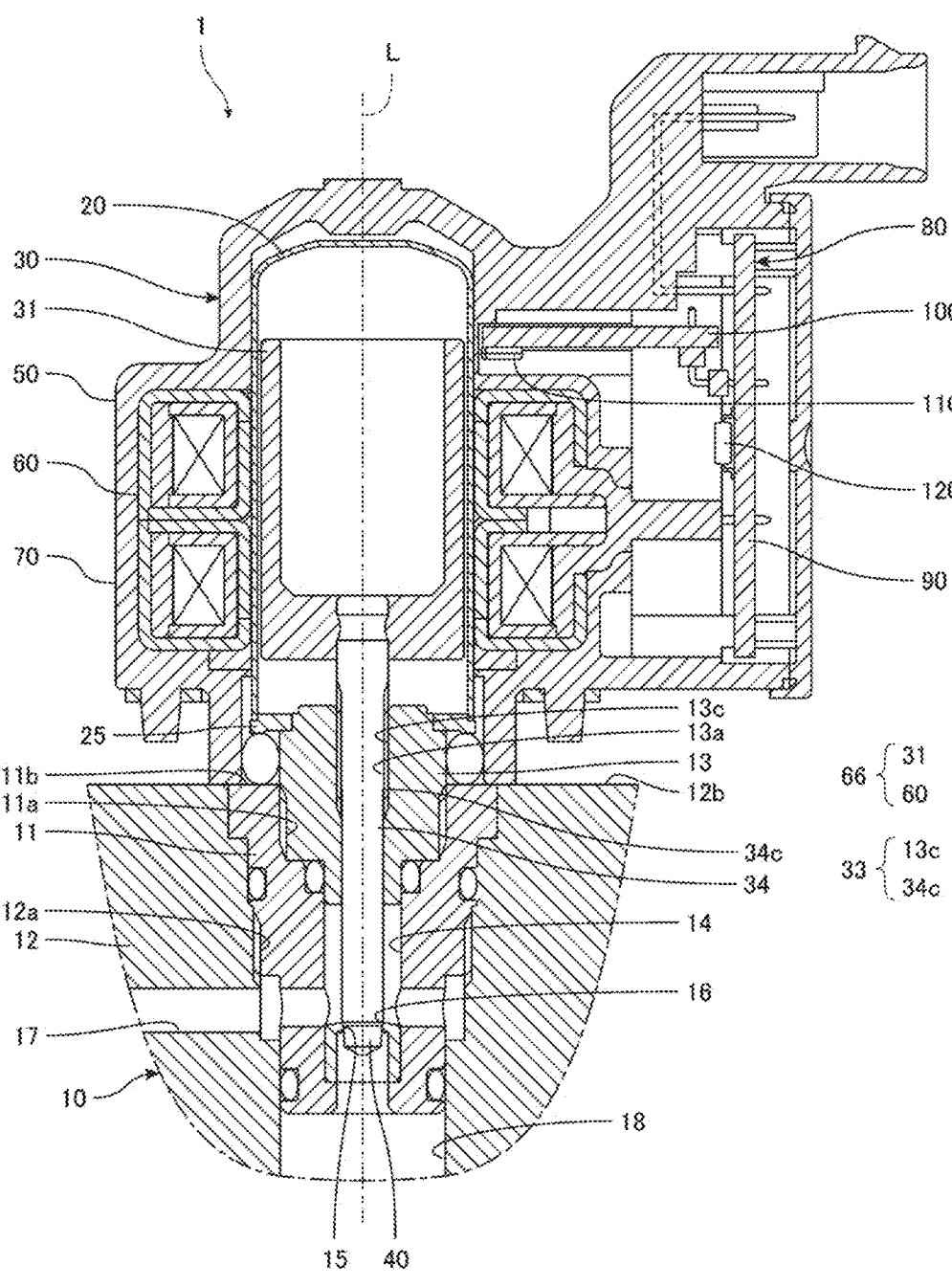
FIG. 1 is a sectional view of an electric valve according to a first embodiment of the present invention.
Figure 2:
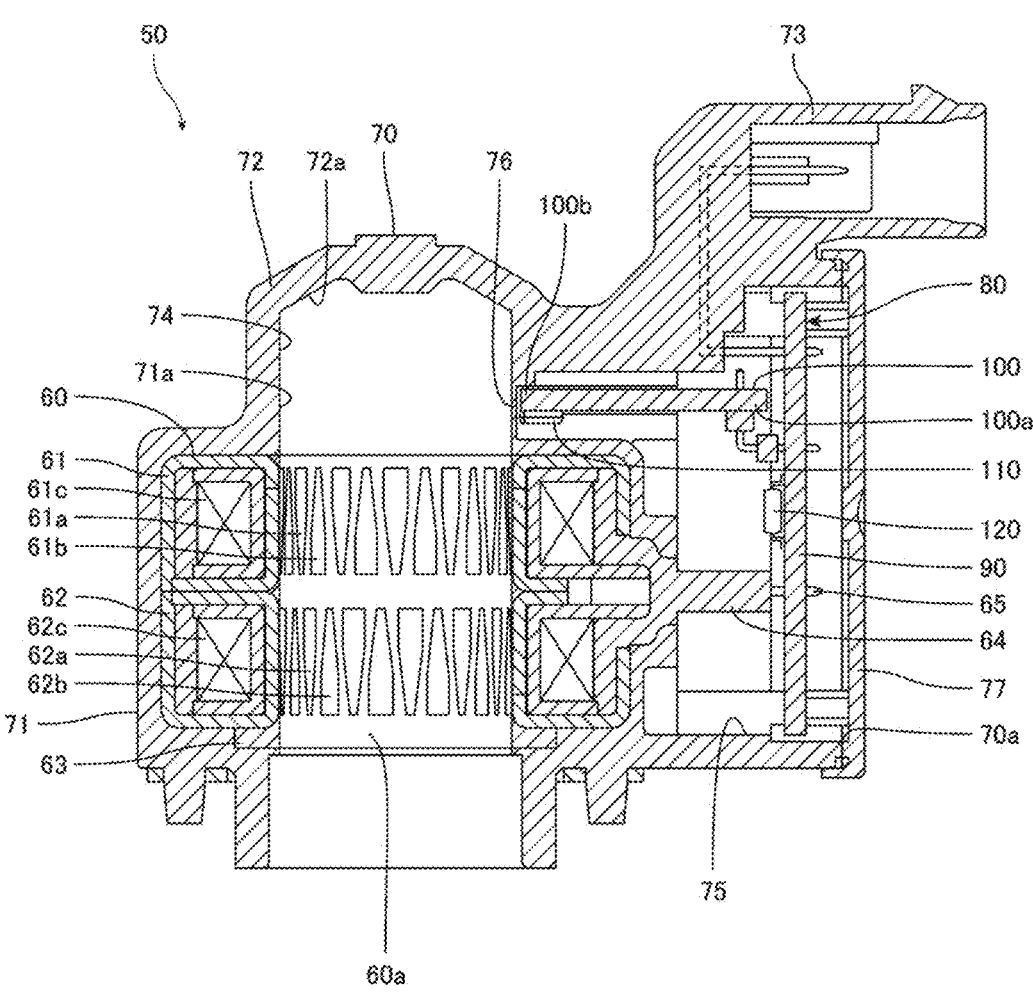
FIG. 2 is a sectional view of a stator unit of the electric valve.
Figure 3:
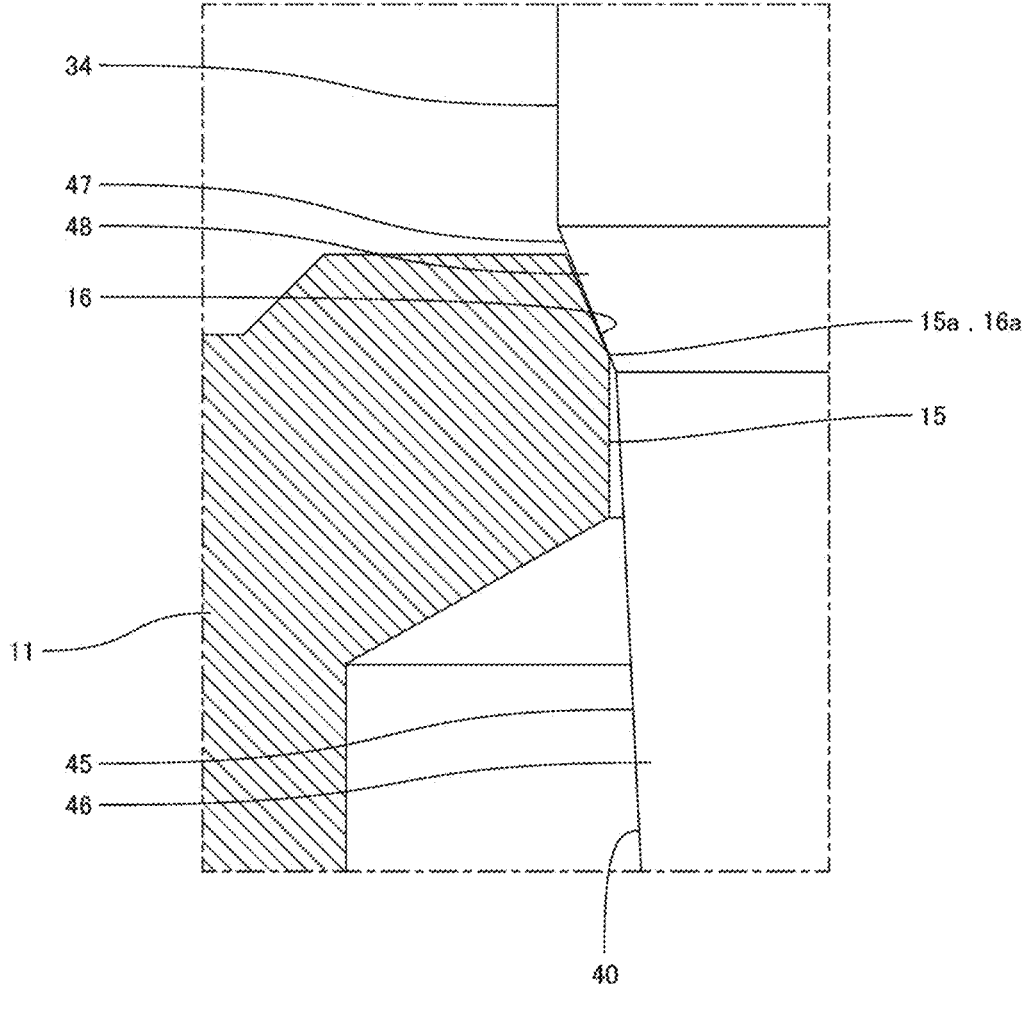
FIG. 3 is a sectional view of a valve member and members in its vicinity of the electric valve when the valve member is in contact with a valve seat.
Figure 4:
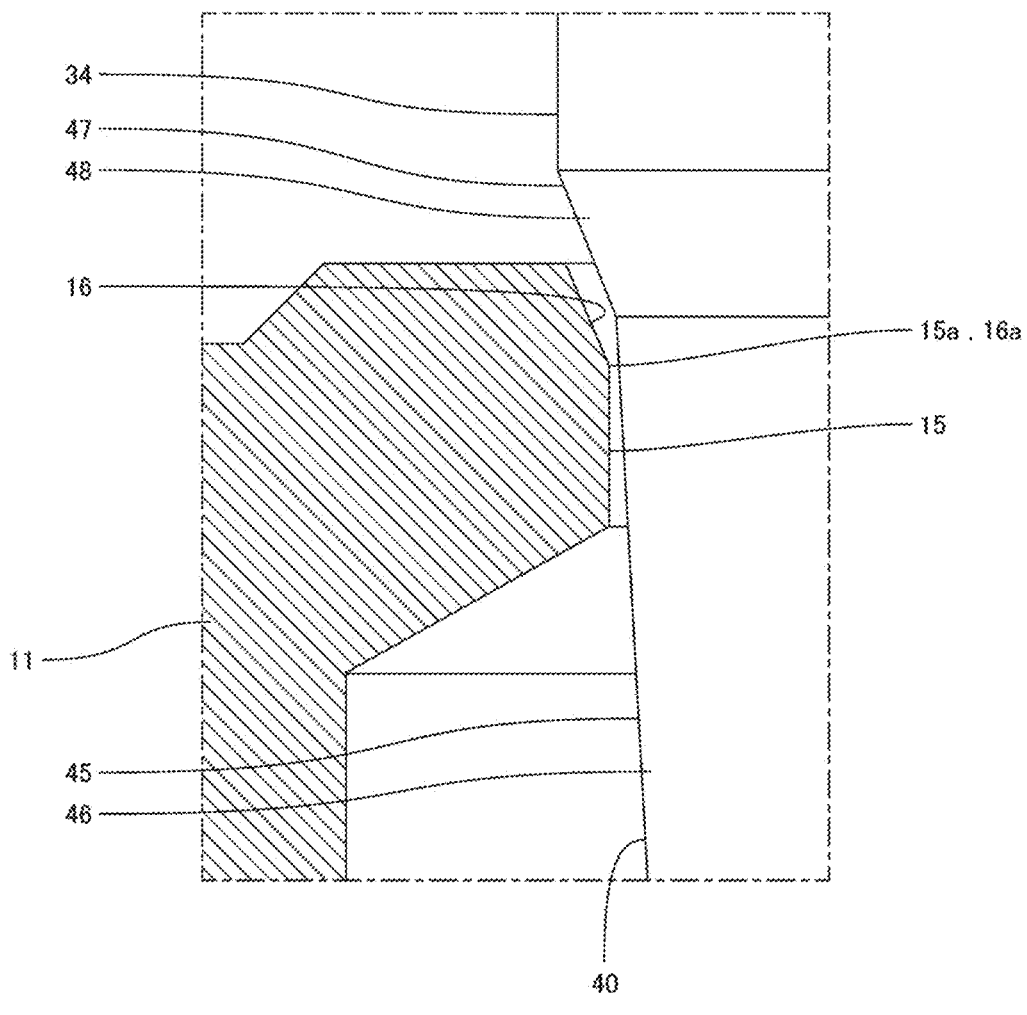
FIG. 4 is a sectional view of the valve member and the members in its vicinity of the electric valve when the valve member is separated from the valve seat.
Figure 5:
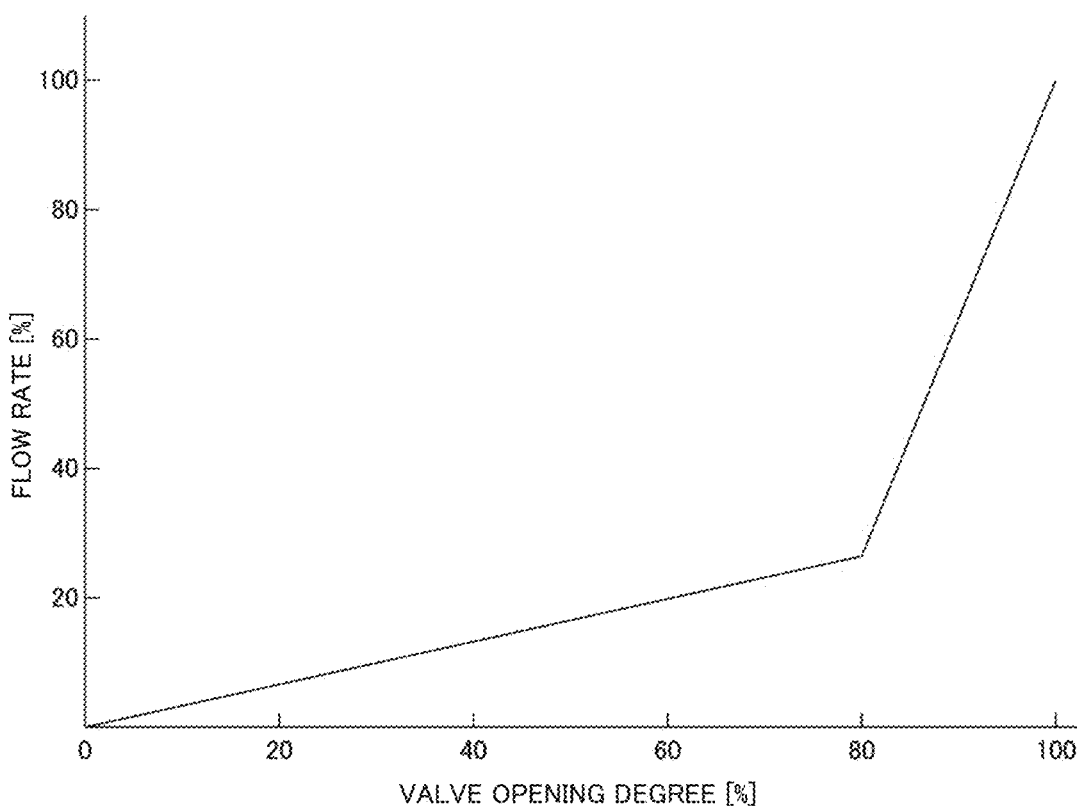
FIG. 5 is a graph showing a relationship between a valve opening degree and a flow rate in the electric valve.
Figure 6:
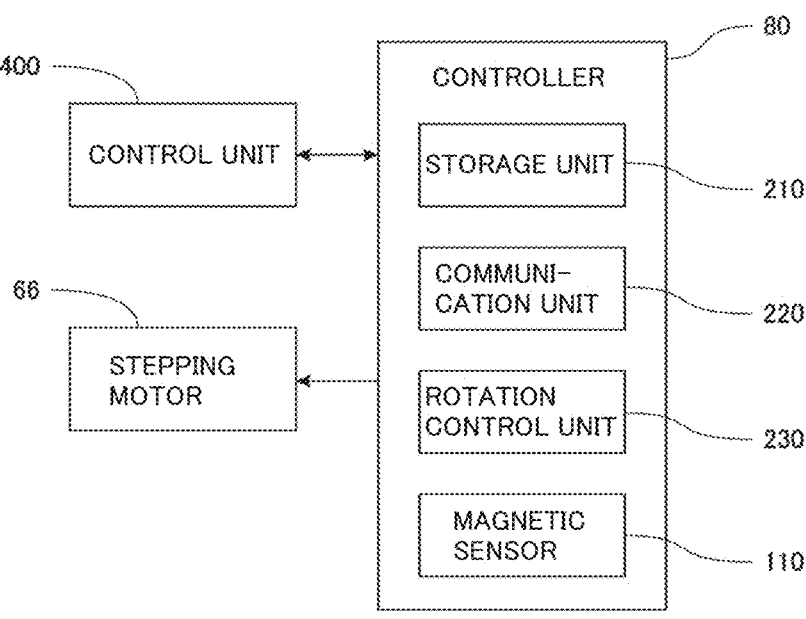
FIG. 6 is a functional block diagram of the electric valve.
Figure 7:
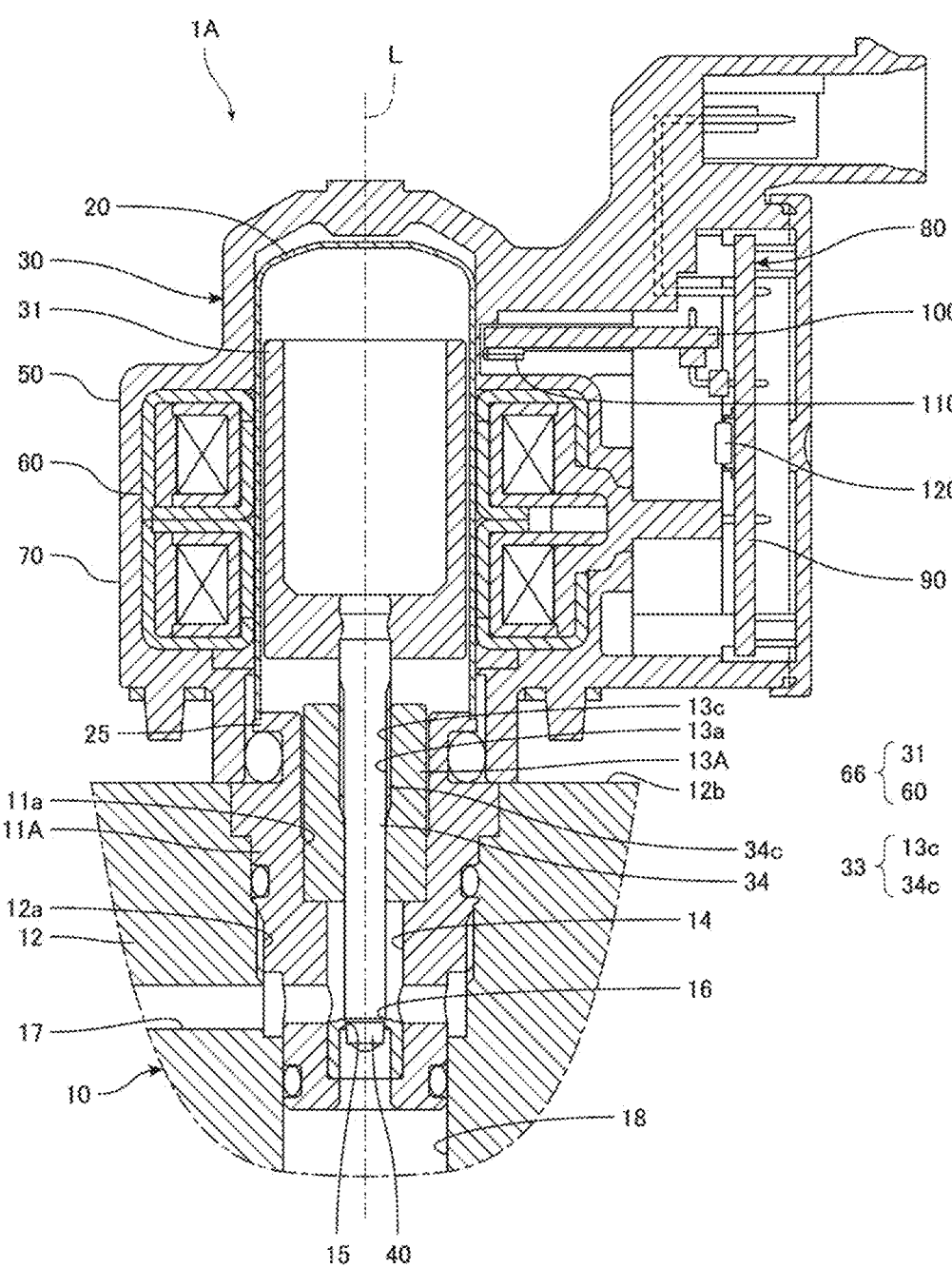
FIG. 7 is a sectional view illustrating a configuration of a modification of the electric valve in FIG. 1.

FIG. 1 is a sectional view of an electric valve according to the first embodiment of the present invention. FIG. 2 is a sectional view of a stator unit of the electric valve. FIGS. 3 and 4 are sectional views of a valve member and members in its vicinity of the electric valve. FIG. 3 illustrates a state where the valve member is in contact with a valve seat. FIG. 4 illustrates a state where the valve member is separated from the valve seat. In FIGS. 1, 3, and 4, a valve stem and the valve member of the electric valve are illustrated in front view. FIG. 5 is a graph showing a relationship between a valve opening degree and a flow rate in the electric valve. FIG. 6 is a functional block diagram of the electric valve. FIG. 7 is a sectional view illustrating a configuration of a modification of the electric valve in FIG. 1.

As illustrated in FIGS. 1 and 2, the electric valve 1 includes a valve body 10, a can 20, a driving mechanism 30, a valve member 40, and a controller 80.

The valve body 10 is made of a metal, such as an aluminum alloy. The valve body 10 includes a body member 11, a flow channel block 12, and a supporting member 13.

The body member 11 has a circular cylindrical shape. The body member 11 has a valve chamber 14, a valve port 15, and a valve seat 16. The valve port 15 is open to the valve chamber 14. The valve seat 16 is an inward tapered surface with a circular annular shape. The valve seat 16 encloses the valve port 15 in the valve chamber 14. An inner peripheral edge 16a of the valve seat 16 is connected to an upper end 15a of the valve port 15. The body member 11 has a first mounting hole 11a. The first mounting hole 11a is provided on an upper surface 11b of the body member 11.

The flow channel block 12 has a rectangular parallelepiped shape. The flow channel block 12 has a second mounting hole 12a. The second mounting hole 12a is provided on an upper surface 12b of the flow channel block 12. The body member 11 is disposed in the second mounting hole 12a. The body member 11 is mounted in the flow channel block 12 by a screw structure. The upper surface 11b of the body member 11 is flush with the upper surface 12b of the flow channel block 12. Flow channels 17 and 18 are provided in the body member 11 and the flow channel block 12. The flow channel 17 is connected to the valve chamber 14. The flow channel 18 is connected to the valve chamber 14 through the valve port 15. In the electric valve 1, the flow channel block 12 can be omitted, and the body member 11 may have a rectangular parallelepiped shape.

The supporting member 13 has a circular cylindrical shape. The supporting member 13 is disposed in the first mounting hole 11a. The supporting member 13 is mounted in the body member 11 by a screw structure. The upper part of the supporting member 13 projects upward from the upper surface 11b of the body member 11. The supporting member 13 has a valve stem hole 13a extending there-through in an up-and-down direction (a direction of an axis L). The valve stem hole 13a faces the valve port 15 in the up-and-down direction. The valve stem hole 13a is provided coaxially with the valve port 15. The supporting member 13 has an internal thread 13c. The internal thread 13c is disposed on the inner circumferential surface of the valve stem hole 13a.

The can 20 is made of a metal, such as stainless steel. The can 20 has a circular cylindrical shape. The can 20 is open at the lower end and is closed at the upper end. The lower end of the can 20 is secured to the upper part of the supporting member 13 by using a connecting member 25 having a circular annular plate-like shape.

As an electric valve 1A illustrated in FIG. 7, a supporting member 13A may be mounted in a body member 11A by a press-fit structure. In the electric valve 1A, the upper part of the body member 11A projects upward from an upper surface 12b of a flow channel block 12, and the lower end of a can 20 is secured to the upper part of the body member 11A.

The driving mechanism 30 moves the valve member 40 in the up-and-down direction. The driving mechanism 30 includes a magnet rotor 31, a valve stem 34, and a stator unit 50.

The magnet rotor 31 has a circular cylindrical shape. The magnet rotor 31 is open at the upper end and is closed at the lower end. The outer diameter of the magnet rotor 31 is smaller than the inner diameter of the can 20. The magnet rotor 31 has a plurality of north (N) poles and a plurality of south (S) poles. The N poles and the S poles are disposed on the outer circumferential surface of the magnet rotor 31. The N poles and the S poles each extend in the up-and-down direction. The N poles and the S poles are alternately arranged at regular angular intervals in the circumferential direction. The magnet rotor 31 has, for example, twelve N poles and twelve S poles.

The valve stem 34 has a circular columnar shape. The upper end (one end) of the valve stem 34 is coaxially secured to the lower end of the magnet rotor 31. The valve stem 34 has an external thread 34c. The external thread 34c is disposed on the outer circumferential surface of the valve stem 34. The valve stem 34 is disposed in the valve stem hole 13a, and the external thread 34c is screwed into the internal thread 13c. The internal thread 13c and the external thread 34c constitute a screw-feed mechanism 33. When the valve stem 34 rotates, the valve stem 34 moves upward or downward according to the rotational direction.

The valve member 40 is disposed in the valve chamber 14. The valve member 40 faces the valve port 15 in the up-and-down direction. The valve member 40 is connected to the lower end (the other end) of the valve stem 34. For example, the valve stem 34 and the valve member 40 are integrally formed by cutting a workpiece with a circular columnar shape.

The valve member 40 includes a control portion 45 and a seating portion 47. The control portion 45 has a tapered shape (a truncated conical shape) with a diameter gradually decreasing toward the valve port 15. The seating portion 47 has a tapered shape with a diameter gradually decreasing toward the valve port 15. The cone angle of the control portion 45 is smaller than that of the seating portion 47. The upper end of the control portion 45 is connected to the lower end of the seating portion 47. The outer circumferential surface of the control portion 45 serves as a control surface 46. The outer circumferential surface of the seating portion 47 serves as a seating surface 48. The control surface 46 and the seating surface 48 are outward tapered surfaces.

The valve member 40 is moved in the up-and-down direction by the driving mechanism 30. The movement of the valve member 40 opens and closes the valve port 15. As illustrated in FIG. 3, when the seating surface 48 is in contact with the inner peripheral edge 16a of the valve seat 16, the valve port 15 is closed. As illustrated in FIG. 4, when the seating surface 48 is separated from the inner peripheral edge 16a of the valve seat 16, the valve port 15 is open. When the seating surface 48 is separated from the inner peripheral edge 16a, a circular annular gap (a throttle passage) is formed between the inner peripheral edge 16a and the valve member 40. The area of the throttle passage is closely related to the flow rate of fluid flowing through the valve port 15.

The graph in FIG. 5 shows the relationship between a valve opening degree and the flow rate in the electric valve 1. The valve opening degree indicates, as a percentage, a position of the valve member 40 with respect to the valve seat 16 (a moving amount of the valve member 40 from a position where the valve member 40 is in contact with the valve seat 16). The position of the valve member 40 corresponds to the position of the magnet rotor 31. In the electric valve 1, the magnet rotor 31 is positioned at a reference position Rx when the seating surface 48 is in contact with the inner peripheral edge 16a of the valve seat 16, and the valve opening degree when the magnet rotor 31 is at the reference position Rx is set to 0%. The magnet rotor 31 is positioned at a full-open position Rz by rotating a predetermined rotation angle from the reference position Rx, and the valve opening degree when the magnet rotor 31 is at the full-open position Rz is set to 100%. The flow rate indicates, as a percentage, the flow rate of the fluid flowing through the valve port 15. The flow rate when the magnet rotor 31 is at the reference position Rx is set to 0%, and the flow rate when the magnet rotor 31 is at the full-open position Rz is set to 100%.

When the magnet rotor 31 rotates in a valve opening direction, the screw-feed mechanism 33 moves the valve stem 34 and the valve member 40 upward. When the magnet rotor 31 rotates in a valve closing direction, the screw-feed mechanism 33 moves the valve stem 34 and the valve member 40 downward. When the valve member 40 moves downward and the seating surface 48 comes into contact with the inner peripheral edge 16a of the valve seat 16, the valve member 40 and the valve stem 34 is restricted from moving downward. When the valve stem 34 is restricted from moving downward, the external thread 34c is firmly screwed into the internal thread 13c, which stops the screw-feed mechanism. Therefore, the rotation of the valve stem 34 and the magnet rotor 31 in the valve closing direction is restricted by the screw-feed mechanism 33.

The stator unit 50 includes a stator 60 and a housing 70.

The stator 60 has a circular cylindrical shape. The stator 60 includes an A-phase stator 61, a B-phase stator 62, and a molded element 63 made of synthetic resin.

The A-phase stator 61 includes a plurality of claw-pole type pole teeth 61a and 61b in the inner circumference. The tip ends of the pole teeth 61*a* point down, and the tip ends of the pole teeth 61*b* point up. The pole teeth 61*a* and the pole teeth 61*b* are alternately arranged at regular angular intervals in the circumferential direction. The A-phase stator 61 has, for example, twelve pole teeth 61*a* and twelve pole teeth 61*b*. The angle between the pole tooth 61*a* and the pole tooth 61*b* adjacent to each other is 15 degrees. When a coil 61*c* of the A-phase stator 61 is energized, the pole teeth 61*a* and the pole teeth 61*b* have opposite polarities.

The B-phase stator 62 includes a plurality of claw-pole type pole teeth 62*a* and 62*b* in the inner circumference. The tip ends of the pole teeth 62*a* point down, and the tip ends of the pole teeth 62*b* point up. The pole teeth 62*a* and the pole teeth 62*b* are alternately arranged at regular angular intervals in the circumferential direction. The B-phase stator 62 has, for example, twelve pole teeth 62*a* and twelve pole teeth 62*b*. The angle between the pole tooth 62*a* and the pole tooth 62*b* adjacent to each other is 15 degrees. When a coil 62*c* of the B-phase stator 62 is energized, the pole teeth 62*a* and the pole teeth 62*b* have opposite polarities.

The A-phase stator 61 is disposed coaxially with the B-phase stator 62. The A-phase stator 61 is in contact with the B-phase stator 62. When viewed in the direction of the axis L, the angle between the pole tooth 61*a* of the A-phase stator 61 and the pole tooth 62*a* of the B-phase stator 62 adjacent to each other is 7.5 degrees.

The molded element 63 fills the A-phase stator 61 and the B-phase stator 62. The molded element 63 forms a stator inner-circumferential surface 60*a* together with the pole teeth 61*a* and 61*b* and the pole teeth 62*a* and 62*b*. The diameter of the stator inner-circumferential surface 60*a* is equal to that of the outer circumferential surface of the can 20. The molded element 63 includes a terminal supporting portion 64.

The terminal supporting portion 64 extends in a lateral direction (a direction perpendicular to the axis L) from the A-phase stator 61 and the B-phase stator 62. The terminal supporting portion 64 supports terminals 65. The terminals 65 extend in the lateral direction from the tip end of the terminal supporting portion 64. The terminals 65 are connected to the coil 61*c* of the A-phase stator 61 and the coil 62*c* of the B-phase stator 62.

In the electric valve 1, the respective central axes of the body member 11 (the valve port 15 and the valve seat 16), the supporting member 13 (the valve stem hole 13*a*), the can 20, the magnet rotor 31, the valve stem 34, the valve member 40 (the control portion 45 and the seating portion 47), and the stator 60 (the A-phase stator 61 and the B-phase stator 62) are aligned with the axis L.

The can 20 is disposed inside the stator 60. The magnet rotor 31 is disposed inside the can 20. The magnet rotor 31 and the stator 60 are members of a stepping motor 66.

In the electric valve 1, when the seating surface 48 is in contact with the inner peripheral edge 16*a* of the valve seat 16, the magnet rotor 31 is at the reference position Rx. When the magnet rotor 31 is at the reference position Rx, inputting a maximum number z of pulses to the stepping motor 66 travels the magnet rotor 31 from the reference position Rx to the full-open position Rz. The maximum number z is predetermined and is set to 500 in the embodiment. The step angle of the stepping motor 66 is 3.75 degrees. In this specification, "inputting pulses to the stepping motor 66" is synonymous with "supplying driving currents corresponding to the pulses to the stator 60 of the stepping motor 66".

In the electric valve 1, the position of the magnet rotor 31 corresponds to the number of pulses input to the stepping motor 66. Specifically, numbers 0 to z are assigned to respective positions that are obtained by dividing the rotation angle from the reference position Rx to the full-open position Rz by the maximum number z. In the embodiment, the positions are represented as positions [0] to [500].

The housing 70 is made of synthetic resin. The housing 70 houses the stator 60 and the controller 80. The housing 70 includes a peripheral wall portion 71, an upper wall portion 72, and a connector 73.

The peripheral wall portion 71 has a circular cylindrical shape. The stator 60 is embedded in the peripheral wall portion 71. The diameter of an inner circumferential surface 71*a* of the peripheral wall portion 71 is equal to that of the stator inner-circumferential surface 60*a*. The inner circumferential surface 71*a* is flush and continuous with the stator inner-circumferential surface 60*a*. The upper wall portion 72 has a dome shape. The upper wall portion 72 is connected to the upper end of the peripheral wall portion 71. The connector 73 is disposed in the upper part of the housing 70. The inner circumferential surface 71*a* of the peripheral wall portion 71, an inner surface 72*a* of the upper wall portion 72, and the stator inner-circumferential surface 60*a* define an inner space 74 of the stator unit 50. The can 20 is disposed in the inner space 74.

The housing 70 has a circuit board space 75. The circuit board space 75 is next to the inner space 74. A partition wall 76 is disposed between the inner space 74 and the circuit board space 75. The partition wall 76 separates the inner space 74 from the circuit board space 75. The housing 70 has an opening 70*a* that communicates with the circuit board space 75, and the opening 70*a* is closed by a lid member 77.

The controller 80 is disposed in the circuit board space 75 of the housing 70. The controller 80 includes a main circuit board 90, a sub circuit board 100, a magnetic sensor 110, and a microcomputer 120.

The main circuit board 90 is a printed circuit board on which electronic components are mounted. The main circuit board 90 is housed in the circuit board space 75. The main circuit board 90 is arranged parallel to the up-and-down direction. The microcomputer 120 is mounted on the main circuit board 90. The terminals 65 of the stator 60 are connected to the main circuit board 90.

The sub circuit board 100 is a printed circuit board on which electronic components are mounted. The sub circuit board 100 is housed in the circuit board space 75. The sub circuit board 100 is arranged perpendicular to the main circuit board 90. A first end 100*a* of the sub circuit board 100 is disposed near the main circuit board 90. A second end 100*b* of the sub circuit board 100 is disposed near the partition wall 76. The sub circuit board 100 is connected to the main circuit board 90 via a board-to-board connector.

The magnetic sensor 110 is, for example, a Hall IC. The magnetic sensor 110 is disposed on the second end 100*b* of the sub circuit board 100. The magnetic sensor 110 and the magnet rotor 31 are laterally arranged with the can 20 and the partition wall 76 in between. The magnetic sensor 110 outputs a signal (ON signal/OFF signal) corresponding to the direction of the magnetic field generated by the magnet rotor 31. The electric valve 1 may include a permanent magnet that rotates together with the magnet rotor 31, and the magnetic sensor 110 may output a signal corresponding to the direction of the magnetic field generated by the permanent magnet.

For example, the microcomputer 120 is a microcomputer for embedded devices in which a central processing unit, a non-volatile memory, a working memory, a communication module, a motor driver, and so on are integrated in one package. The microcomputer 120 controls the electric valve 1. A non-volatile memory, a working memory, a communication module, and a motor driver may be separate electronic components that are externally connected to the microcomputer 120.

As illustrated in FIG. 6, the controller 80 includes a storage unit 210, a communication unit 220, and a rotation control unit 230. The non-volatile memory serves as the storage unit 210. The central processing unit executes a program stored in the non-volatile memory and functions as the communication unit 220 and the rotation control unit 230. The working memory stores variables used by the rotation control unit 230. The communication module is connected to the control unit 400 of the air conditioner via a cable, which is not illustrated, connected to the connector 73. The motor driver is connected to the stepping motor 66. Specifically, the motor driver is connected to the coil 61c of the A-phase stator 61 and the coil 62c of the B-phase stator 62. The motor driver supplies the driving currents corresponding to the pulses to the coil 61c and the coil 62c.

The storage unit 210 stores, for example, a present position Rc of the magnet rotor 31 immediately before the electric valve 1 is powered off. When the electric valve 1 is in operation, the present position Rc is stored in the working memory.

The communication unit 220 communicates with the control unit 400 through the communication module. The communication unit 220 receives various commands from the control unit 400 and transfers them to the rotation control unit 230. The communication unit 220 obtains the state of the electric valve 1 from the rotation control unit 230 and transmits it to the control unit 400.

The communication unit 220 receives a valve-member movement command from the control unit 400. The valve-member movement command contains information regarding a target position Rt of the magnet rotor 31. The information indicates a valve opening degree to be targeted. The information may indicate a rotation angle relative to the present position Rc of the magnet rotor 31 (specifically, the number of pulses to be input to the stepping motor 66 and the direction of the rotation of the magnet rotor 31). The rotation control unit 230 obtains the target position Rt of the magnet rotor 31 based on the information.

In the electric valve 1, 0 [%] to 100 [%] of the valve opening degree correspond to positions [0] to [500] of the magnet rotor 31. Position [0] is the reference position Rx, and position [500] is the full-open position Rz. For example, when the valve opening degree contained in the valve-member movement command indicates 0%, the target position Rt is position [0]. When the valve opening degree contained in the valve-member movement command indicates 25%, the target position Rt is position [125]. When the valve opening degree contained in the valve-member movement command indicates 50%, the target position Rt is position [250]. When the valve opening degree contained in the valve-member movement command indicates 75%, the target position Rt is position [375]. When the valve opening degree contained in the valve-member movement command indicates 100%, the target position Rt is position [500].

When the communication unit 220 receives the valve-member movement command, the rotation control unit 230 obtains, as the target position Rt, the position of the magnet rotor 31 corresponding to the valve opening degree contained in the valve-member movement command. For example, the rotation control unit 230 obtains position [100] as the target position Rt when the valve opening degree indicates 20 [%], obtains position [400] as the target position Rt when the valve opening degree indicates 80 [%], and obtains position [500] as the target position Rt when the valve opening degree indicates 100 [%].

When the number of the position serving as the target position Rt of the magnet rotor 31 is greater than the number of the position serving as the present position Rc, the rotation control unit 230 inputs pulses, whose number is obtained by subtracting the number of the position serving as the present position Rc from the number of the position serving as the target position Rt, to the stepping motor 66 to rotate the magnet rotor 31 in the valve opening direction.

When the number of the position serving as the target position Rt of the magnet rotor 31 is smaller than the number of the position serving as the present position Rc, the rotation control unit 230 inputs pulses, whose number is obtained by subtracting the number of the position serving as the target position Rt from the number of the position serving as the present position Rc, to the stepping motor 66 to rotate the magnet rotor 31 in the valve closing direction.

The rotation control unit 230 obtains the rotation angle of the magnet rotor 31 based on the signal output by the magnetic sensor 110 and determines the state (a rotating state/a non-rotating state) of the magnet rotor 31. When the magnet rotor 31 rotates, the magnetic sensor 110 alternately outputs ON and OFF signals. When the magnet rotor 31 does not rotates, the magnetic sensor 110 continuously outputs ON or OFF signal. The controller 80 detects the rotation angle of the magnet rotor 31 based on the count of ON and OFF signal switches. When a change in the signal (ON and OFF signal switch) is detected, the controller 80 determines that "the rotating state" where the magnet rotor 31 is rotating is indicated. When the change in the signal is not detected, the controller 80 determines that "the non-rotating state" where the magnet rotor 31 is not rotating is indicated. When the rotation control unit 230 rotates the magnet rotor 31 in the valve closing direction and determines that the non-rotating state is indicated, the rotation control unit 230 detects that the rotation of the magnet rotor 31 in the valve closing direction is restricted.

The rotation control unit 230 determines whether the valve-member movement command has succeeded or failed. Specifically, the rotation control unit 230 obtains a rotation angle (a calculated rotation angle) of the magnet rotor 31 by multiplying the number of pulses input to the stepping motor 66 by the step angle and a rotation angle (a measured rotation angle) of the magnet rotor 31 based on the signal of the magnetic sensor 110. The rotation control unit 230 compares the calculated rotation angle with the measured rotation angle. When the calculated rotation angle matches the measured rotation angle, the rotation control unit 230 transmits information, as a command result, to the control unit 400 through the communication unit 220, and the information indicates that the valve-member movement command has succeeded. When the calculated rotation angle does not match the measured rotation angle, the rotation control unit 230 transmits information, as a command result, to the control unit 400 through the communication unit 220, and the information indicates that the valve-member movement command has failed.

An example of an operation of the electric valve 1 is described below.

The controller 80 of the electric valve 1 transitions to a start-up mode when the controller 80 is powered on.

In the start-up mode, when the present position Rc of the magnet rotor 31 is stored in the storage unit 210, the controller 80 copies the present position Rc from the storage unit 210 to the working memory and then transitions to a normal operation mode. In the normal operation mode, the controller 80 waits for a command transmitted from the control unit 400.

In the start-up mode, when the present position Rc is not stored in the storage unit 210, the controller 80 transitions to an initialization operation mode. Alternatively, when the controller 80 receives an initialization command from the control unit 400 in the normal operation mode, the controller 80 transitions to the initialization operation mode.

In the initialization operation mode, the controller 80 inputs pulses to the stepping motor 66 to rotate the magnet rotor 31 in the valve closing direction. The controller 80 determines that the rotating state is indicated when the change in the signal of the magnetic sensor 110 is detected. The controller 80 determines that the non-rotating state is indicated when the change in the signal of the magnetic sensor is not detected. When the controller 80 determines that the non-rotating state is indicated, the controller 80 detects that the rotation of the magnet rotor 31 in the valve closing direction is restricted. The controller 80 stores position [0], which is the reference position Rx, as the present position Rc in the working memory and transitions to the normal operation mode.

In the normal operation mode, when the controller 80 receives the valve-member movement command from the control unit 400, the controller 80 rotates the magnet rotor 31 to move the valve member 40 to achieve the valve opening degree contained in the valve-member movement command.

For example, when the present position Rc is position [0] and the valve opening degree contained in the valve-member movement command indicates 80%, the controller 80 obtains position as the target position Rt. The controller 80 inputs 400(400=400–0) pulses to the stepping motor 66 to rotate the magnet rotor 31 in the valve opening direction. This causes the screw-feed mechanism 33 to move the valve stem 34 and the magnet rotor 31 upward, separating the valve member 40 from the valve seat 16 and positioning the valve member 40 at a position corresponding to position [400] (80% of the valve opening degree). When the controller 80 finishes inputting pulses to the stepping motor 66, the controller 80 stores position as the present position Rc in the working memory. The controller 80 determines whether the valve-member movement command has succeeded or failed and transmits the command result to the control unit 400. Then, the controller 80 waits for the following command transmitted from the control unit 400.

For example, when the present position Rc is position [400] and the valve opening degree contained in the valve-member movement command indicates 30%, the controller 80 obtains position [150] as the target position Rt. The controller 80 inputs 250(250=400–150) pulses to the stepping motor 66 to rotate the magnet rotor 31 in the valve closing direction. This causes the screw-feed mechanism 33 to move the valve stem 34 and the magnet rotor 31 downward, moving the valve member 40 toward the valve seat 16 and positioning the valve member 40 at a position corresponding to position [150] (30% of the valve opening degree). When the controller 80 finishes inputting pulses to the stepping motor 66, the controller 80 stores position [150] as the present position Rc in the working memory. The controller 80 determines whether the valve-member movement command has succeeded or failed and transmits the command result to the control unit 400. Then, the controller 80 waits for the following command transmitted from the control unit 400.

For example, when the present position Rc is position and the valve opening degree contained in the valve-member movement command indicates 100%, the controller 80 obtains position [500] as the target position Rt. The controller 80 inputs 350 (350=500–150) pulses to the stepping motor 66 to rotate the magnet rotor 31 in the valve opening direction. This causes the screw-feed mechanism 33 to move the valve stem 34 and the magnet rotor 31 upward, moving the valve member 40 away from the valve seat 16 and positioning the valve member 40 at a position corresponding to position [500] (100% of the valve opening degree). When the controller 80 finishes inputting pulses to the stepping motor 66, the controller 80 stores position [500] as the present position Rc in the working memory. The controller 80 determines whether the valve-member movement command has succeeded or failed and transmits the command result to the control unit 400. Then, the controller 80 waits for the following command transmitted from the control unit 400.

For example, when the present position Rc is position [500] and the valve opening degree contained in the valve-member movement command indicates 0%, the controller 80 obtains position [0] as the target position Rt. The controller 80 inputs 500 (500=500–0) pulses to the stepping motor 66 to rotate the magnet rotor 31 in the valve closing direction. This causes the screw-feed mechanism 33 to move the valve stem 34 and the magnet rotor 31 downward, bringing the valve member 40 into contact with the valve seat 16 and positioning the valve member 40 at a position corresponding to position [0] (0% of the valve opening degree). When the controller 80 finishes inputting pulses to the stepping motor 66, the controller 80 stores position [0] as the present position Rc in the working memory. The controller 80 determines whether the valve-member movement command has succeeded or failed and transmits the command result to the control unit 400. Then, the controller 80 waits for the following command transmitted from the control unit 400.

When the valve opening degree contained in the valve-member movement command indicates less than 0% (i.e., a negative value) or greater than 100%, the controller 80 transmits a command result indicating a reception of an illegal valve opening degree to the control unit 400. Then, the controller 80 waits for the following command transmitted from the control unit 400.

When the controller 80 receives a power-off command from the control unit 400, the controller 80 copies the present position Rc from the working memory to the storage unit 210 and prepares for power-off.

The electric valve 1 includes the valve body 10 that has the valve port 15 and the valve seat 16 enclosing the valve port 15, the valve member 40 that faces the valve port 15, the valve stem 34, and the stepping motor 66. The valve stem 34 has the external thread 34c. The valve body 10 has the valve stem hole 13a disposed coaxially with the valve port 15. The internal thread 13c into which the external thread 34c is screwed is provided on the inner circumferential surface of the valve stem hole 13a. The external thread 34c and the internal thread 13c constitute the screw-feed mechanism 33. The upper end of the valve stem 34 is coaxially secured to the magnet rotor 31 of the stepping motor 66. The lower end (an end) of the valve stem 34 is integrally connected to the valve member 40. When the magnet rotor 31 rotates in the valve closing direction, the valve member 40 moves toward the valve port 15. When the valve member 40 comes into contact with the valve seat 16, the valve seat 16 restricts the valve member 40 from moving toward the valve port 15.

With this configuration, the screw-feed mechanism 33 moves the valve stem 34 and the valve member 40. When the magnet rotor 31 rotates in the valve closing direction, the valve stem 34 also rotates in the valve closing direction. When the valve member 40 comes into contact with the valve seat 16, the valve member 40 is restricted from moving toward the valve port 15, which stops the valve member 40 and the valve stem 34 from moving. The external thread 34*c* is firmly screwed into the internal thread 13*c*, which stops the screw-feed mechanism 33. Therefore, the rotation of the valve stem 34 in the valve closing direction is restricted by the screw-feed mechanism 33, which stops the magnet rotor 31 from rotating. As a result, a stopper to be provided on the magnet rotor 31 can be omitted, and the magnet rotor 31 can be stopped from rotating when the valve member 40 stops moving.

The electric valve 1 includes the controller 80 for controlling the stepping motor 66. In the initialization operation mode, the controller 80 rotates the magnet rotor 31 in the valve closing direction and obtains, as the reference position Rx, the position of the magnet rotor 31 when the rotation of the magnet rotor 31 in the valve closing direction is restricted. In the normal operation mode, the controller 80 positions the magnet rotor 31 based on the reference position Rx. In the normal operation mode, the controller 80 does not rotate the magnet rotor 31 in the valve closing direction beyond the reference position Rx or in the valve opening direction beyond the full-open position Rz. The controller 80 manages the position of the magnet rotor 31 by using the rotation angle (the number of pulses input to the stepping motor 66) from the reference position Rx.

With this configuration, the controller 80 can stop rotating the magnet rotor 31 when the magnet rotor 31 is rotated in the valve closing direction and reaches the reference position Rx. Therefore, the rotation of the magnet rotor 31 in the valve closing direction beyond the reference position Rx can be suppressed, which inhibits wear on the valve seat 16 and power consumption. The controller 80 can stop rotating the magnet rotor 31 when the magnet rotor 31 is rotated in the valve opening direction and reaches the full-open position Rz. Therefore, the rotation of the magnet rotor 31 in the valve opening direction beyond the full-open position Rz can be suppressed, which inhibits the external thread 34*c* and the internal thread 13*c* from being unscrewed. As a result, a stopper for restricting the rotation of the magnet rotor 31 in the valve opening direction can be omitted, and a coil spring for returning the external thread 34*c* and the internal thread 13*c* to being screwed can be omitted.

The controller 80 includes the magnetic sensor 110 that outputs the signal corresponding to the rotation of the magnet rotor 31. The controller 80 detects that the rotation of the magnet rotor 31 in the valve closing direction is restricted based on the signal output by the magnetic sensor 110. As a result, it is possible to detect whether the rotation of the magnet rotor 31 in the valve closing direction is restricted with a comparatively simple configuration. The controller 80 may detect that the rotation of the magnet rotor 31 in the valve closing direction is restricted based on the back electromotive voltage generated in the stator 60 when the rotation of the magnet rotor 31 is restricted.

Second Embodiment

Figure 8:
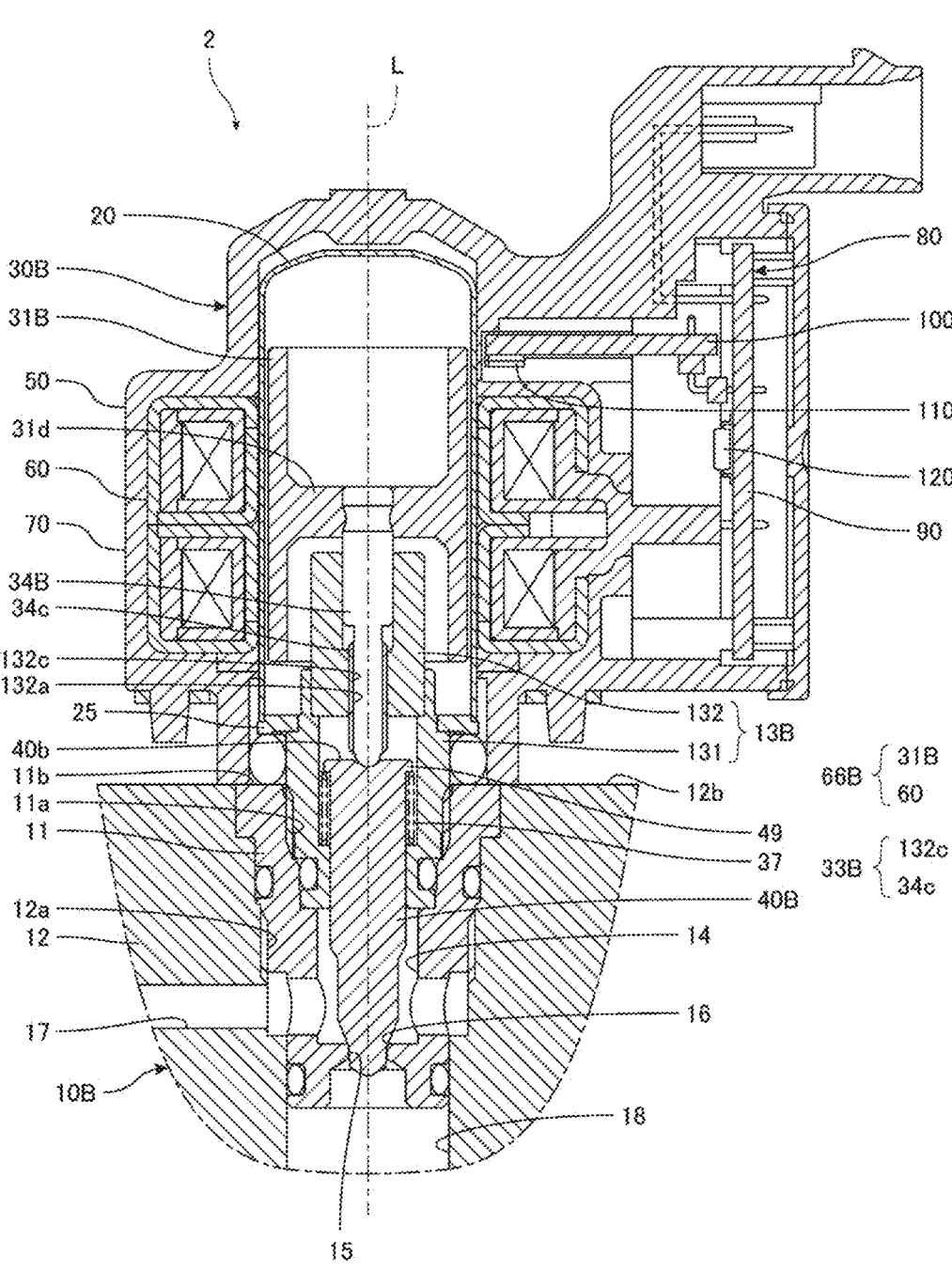
FIG. 8 is a sectional view of an electric valve according to a second embodiment of the present invention.

An electric valve 2 according to a second embodiment of the present invention is described below with reference to FIG. 8. FIG. 8 is a sectional view of an electric valve according to the second embodiment of the present invention.

As illustrated in FIG. 8, the electric valve 2 includes a valve body 10B, a can 20, a driving mechanism 30B, a valve member 40B, and a controller 80. In the description below, elements having the same (including substantially the same) configurations as those of the electric valve 1 are denoted by the same reference signs as those of the electric valve 1, and detailed descriptions of these elements are omitted.

The valve body 10B is made of a metal, such as an aluminum alloy. The valve body 10B includes a body member 11, a flow channel block 12, and a supporting member 13B.

The supporting member 13B includes a first supporting portion 131 and a second supporting portion 132. The first supporting portion 131 has a circular cylindrical shape. The first supporting portion 131 is disposed in a first mounting hole 11*a*. The first supporting portion 131 is mounted in the body member 11 by a screw structure. The second supporting portion 132 is secured to the upper part of the first supporting portion 131. The second supporting portion 132 has a valve stem hole 132*a* extending therethrough in an up-and-down direction. The valve stem hole 132*a* faces an upper end surface 40*b* (an end surface) of the valve member 40B in the up-and-down direction. The valve stem hole 132*a* is disposed coaxially with a valve port 15. The second supporting portion 132 has an internal thread 132*c*. The internal thread 132*c* is disposed on the inner circumferential surface of the valve stem hole 132*a*.

The driving mechanism 30B moves the valve member 40B in the up-and-down direction. The driving mechanism 30B includes a magnet rotor 31B, a valve stem 34B, and a stator unit 50.

The magnet rotor 31B has a circular cylindrical shape. A wall portion 31*d* is provided inside the magnet rotor 31B. The wall portion 31*d* is disposed at the center of the magnet rotor 31B in the up-and-down direction. The magnet rotor 31B and a stator 60 are members of a stepping motor 66B.

The valve stem 34B has a circular columnar shape. The upper end of the valve stem 34B is coaxially secured to the wall portion 31*d* of the magnet rotor 31B. The valve stem 34B has an external thread 34*c*. The external thread 34*c* is disposed on the outer circumferential surface of the valve stem 34B. The valve stem 34B is disposed in the valve stem hole 132*a*, and the external thread 34*c* is screwed into the internal thread 132*c*. The internal thread 132*c* and the external thread 34*c* constitute a screw-feed mechanism 33B. When the valve stem 34B rotates, the valve stem 34B moves upward or downward according to the rotational direction.

The valve member 40B has a circular columnar shape. The valve member 40B is supported by the first supporting portion 131 and is movable in the up-and-down direction. The upper part of the valve member 40B is disposed inside the first supporting portion 131, and the lower part is disposed in a valve chamber 14. The valve member 40B faces the valve port 15 in the up-and-down direction. A control portion 45 and a seating portion 47 are provided in the lower part of the valve member 40B. The valve member 40B is connected to the lower end of the valve stem 34B. Specifically, the lower end of the valve stem 34B is in contact with the upper end surface 40*b* of the valve member 40B. A spring receiving portion 49 that has a flange shape and projects radially outward is provided in the upper end of the valve member 40B. A valve opening spring 37 is disposed between the spring receiving portion 49 and the first supporting portion 131. The valve opening spring 37 is a compression coil spring and pushes the valve member 40B upward.

When the magnet rotor 31B rotates in a valve opening direction, the screw-feed mechanism 33B moves the valve stem 34B upward, and the valve opening spring 37 pushes and moves the valve member 40B upward. When the magnet rotor 31B rotates in a valve closing direction, the screw-feed mechanism 33B moves the valve stem 34B downward, and the valve stem 34B pushes and moves the valve member 40B downward. When the valve member 40B moves downward and a seating surface 48 comes into contact with an inner peripheral edge 16a of the valve seat 16, the valve member 40B and the valve stem 34B are restricted from moving downward. Therefore, the rotation of the valve stem 34B and the magnet rotor 31B in the valve closing direction is restricted by the screw-feed mechanism 33B.

The electric valve 2 includes the valve body 10B that has the valve port 15 and the valve seat 16 enclosing the valve port 15, the valve member 40B that faces the valve port 15, the valve stem 34B, and the stepping motor 66B. The valve stem 34B has the external thread 34c. The valve body 10B has the valve stem hole 132a disposed coaxially with the valve port 15. The internal thread 132c into which the external thread 34c is screwed is provided on the inner circumferential surface of the valve stem hole 132a. The external thread 34c and the internal thread 132c constitute the screw-feed mechanism 33B. The upper end of the valve stem 34B is coaxially secured to the magnet rotor 31B of the stepping motor 66B. The lower end (an end) of the valve stem 34B is in contact with the valve member 40B and is connected to the valve member 40B. When the magnet rotor 31B rotates in the valve closing direction, the valve stem 34B pushes the valve member 40B toward the valve port 15, and the valve member 40B moves toward the valve port 15. When the valve member 40B comes into contact with the valve seat 16, the valve seat 16 restricts the valve member 40B from moving toward the valve port 15.

With this configuration, the screw-feed mechanism 33B moves the valve stem 34B and the valve member 40B. When the magnet rotor 31B rotates in the valve closing direction, the valve stem 34B also rotates in the valve closing direction. When the valve member 40B comes into contact with the valve seat 16, the valve member 40B is restricted from moving toward the valve port 15, which stops the valve member 40B and the valve stem 34B from moving. The external thread 34c is firmly screwed into the internal thread 132c, which stops the screw-feed mechanism 33B. Therefore, the rotation of the valve stem 34B in the valve closing direction is restricted by the screw-feed mechanism 33B, which stops the magnet rotor 31B from rotating. As a result, a stopper to be provided on the magnet rotor 31B can be omitted, and the magnet rotor 31B can be stopped from rotating when the valve member 40B stops moving.

The electric valve 2 has the same (including substantially the same) functions and effects as those of the electric valve 1.

Third Embodiment

Figure 9:
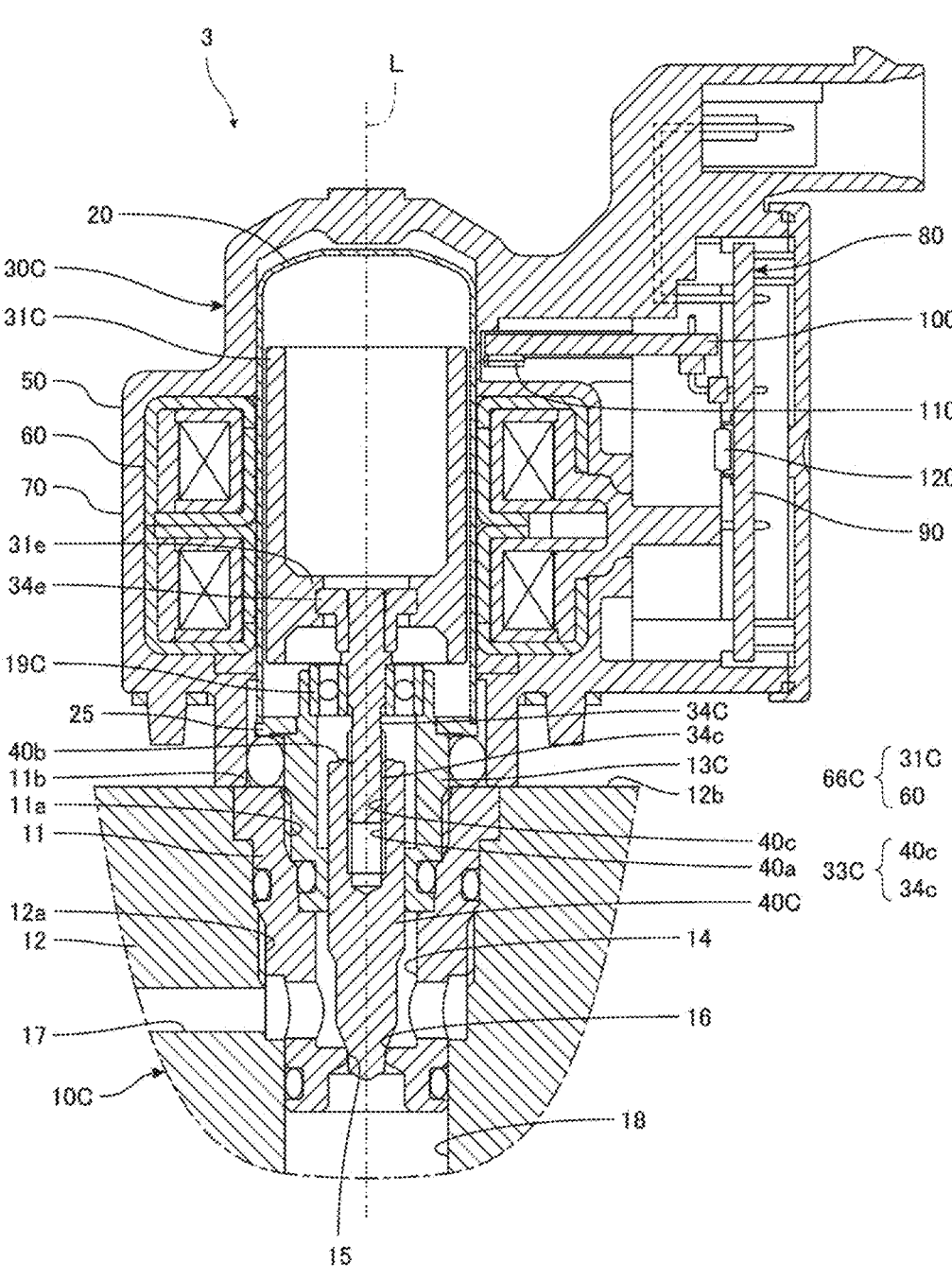
FIG. 9 is a sectional view of an electric valve according to a third embodiment of the present invention.

An electric valve 3 according to a third embodiment of the present invention is described below with reference to FIG. 9. FIG. 9 is a sectional view of an electric valve according to the third embodiment of the present invention.

As illustrated in FIG. 9, the electric valve 3 includes a valve body 10C, a can 20, a driving mechanism 30C, a valve member 40C, and a controller 80. In the description below, elements having the same (including substantially the same) configurations as those of the electric valve 1 are denoted by the same reference signs as those of the electric valve 1, and detailed descriptions of these elements are omitted.

The valve body 10C is made of a metal, such as an aluminum alloy. The valve body 10C includes a body member 11, a flow channel block 12, a supporting member 13C, and a bearing 19C.

The supporting member 13C has a circular cylindrical shape. The supporting member 13C is disposed in a first mounting hole 11a. The supporting member 13C is mounted in the body member 11 by a screw structure. The upper part of the supporting member 13C projects upward from an upper surface 11b of the body member 11.

The bearing 19C is a ball bearing. The bearing 19C is coaxially secured in the upper part of the supporting member 13C. The bearing 19C is disposed coaxially with a valve port 15. The bearing 19C rotatably supports a valve stem 34C.

The driving mechanism 30C moves the valve member 40C in an up-and-down direction. The driving mechanism 30C includes a magnet rotor 31C, the valve stem 34C, and a stator unit 50.

The magnet rotor 31C has a circular cylindrical shape. A wall portion 31e is provided inside the magnet rotor 31C. The wall portion 31e is disposed near the lower end of the magnet rotor 31C. The magnet rotor 31C and a stator 60 are members of a stepping motor 66C.

The valve stem 34C has a circular columnar shape. The upper end of the valve stem 34C is coaxially secured to the wall portion 31e of the magnet rotor 31C via a coupling element 34e. The valve stem 34C has an external thread 34c. The external thread 34c is disposed on the outer circumferential surface of the valve stem 34C.

The valve member 40C has a circular columnar shape. The valve member 40C is supported by the supporting member 13C and is movable in the up-and-down direction. The valve member 40C is restricted from rotating about the central axis. The upper part of the valve member 40C is disposed inside the supporting member 13C, and the lower part is disposed in a valve chamber 14. The valve member 40C faces the valve port 15 in the up-and-down direction. The valve member 40C has a valve stem hole 40a. The valve stem hole 40a is provided on an upper end surface 40b of the valve member 40C. The valve member 40C has an internal thread 40c. The internal thread 40c is disposed on the inner circumferential surface of the valve stem hole 40a. A control portion 45 and a seating portion 47 is provided in the lower part of the valve member 40C. The valve member 40C is connected to the lower end of the valve stem 34C. Specifically, the valve stem 34C is disposed in the valve stem hole 40a, and the external thread 34c is screwed into the internal thread 40c. The internal thread 40c and the external thread 34c constitute a screw-feed mechanism 33C. The screw-feed mechanism 33C connects the valve stem 34C and the valve member 40C. When the valve stem 34C rotates, the valve member 40C moves upward or downward according to the rotational direction of the valve stem 34C. The valve stem 34C does not move upward and downward.

When the magnet rotor 31C rotates in a valve opening direction, the valve stem 34C also rotates in the valve opening direction, and the screw-feed mechanism 33C moves the valve member 40C upward. When the magnet rotor 31C rotates in a valve closing direction, the valve stem 34C also rotates in the valve closing direction, and the screw-feed mechanism 33C moves the valve member 40C downward. When the valve member 40C moves downward and a seating surface 48 comes into contact with an inner peripheral edge 16*a* of a valve seat 16, the valve member 40C is restricted from moving downward. Therefore, the rotation of the valve stem 34C and the magnet rotor 31C in the valve closing direction is restricted by the screw-feed mechanism 33C.

The electric valve 3 includes the valve body 10C that has the valve port 15 and the valve seat 16 enclosing the valve port 15, the valve member 40C that faces the valve port 15, the valve stem 34C, and the stepping motor 66C. The valve body 10C includes the bearing 19C that rotatably supports the valve stem 34C. The bearing 19C is disposed coaxially with the valve port 15. The valve stem 34C has the external thread 34*c*. The valve member 40C has the valve stem hole 40*a*. The internal thread 40*c* into which the external thread 34*c* is screwed is provided on the inner circumferential surface of the valve stem hole 40*a*. The external thread 34*c* and the internal thread 40*c* constitute the screw-feed mechanism 33C. The upper end of the valve stem 34C is coaxially secured to the magnet rotor 31C of the stepping motor 66C. The lower end (an end) of the valve stem 34C is connected to the valve member 40C. When the magnet rotor 31C rotates in the valve closing direction, the valve member 40C moves toward the valve port 15. When the valve member 40C comes into contact with the valve seat 16, the valve seat 16 restricts the valve member 40C from moving toward the valve port 15.

With this configuration, the screw-feed mechanism 33C moves the valve member 40C. When the magnet rotor 31C rotates in the valve closing direction, the valve stem 34C also rotates in the valve closing direction. When the valve member 40C comes into contact with the valve seat 16, the valve member 40C is restricted from moving toward the valve port 15, which stops the valve member 40C from moving. The external thread 34*c* is firmly screwed into the internal thread 40*c*, which stops the screw-feed mechanism 33C. Therefore, the rotation of the valve stem 34C in the valve closing direction is restricted by the screw-feed mechanism 33C, which stops the magnet rotor 31C from rotating. As a result, a stopper to be provided on the magnet rotor 31C can be omitted, and the magnet rotor 31C can be stopped from rotating when the valve member 40C stops moving.

The electric valve 3 has the same (including substantially the same) functions and effects as those of the electric valve 1.

In the electric valves 1 to 3 described above, the valve stem has the external thread, the valve body or the valve member has the internal thread into which the external thread is screwed, and the external and internal threads constitute the screw-feed mechanism. In an electric valve according to the present invention, a valve stem may have an internal thread, a valve body or a valve member may have an external thread screwed into the internal thread, and the external and internal threads may constitute a screw-feed mechanism. In other words, it is sufficient that the electric valve according to the present invention have a configuration in which a valve stem and a valve body constitute a screw-feed mechanism or a valve stem and a valve member constitute a screw-feed mechanism.

In this specification, the terms indicating shapes, such as "circular cylindrical" and "circular columnar", are also used for members and portions of the members substantially having the shapes indicated by the terms. For example, "circular cylindrical member" includes a circular cylindrical member and a substantially circular cylindrical member.

The embodiments of the present invention are described above. The present invention, however, is not limited to these embodiments. Embodiments obtained by a person skilled in the art appropriately adding, removing, or modifying components according to the embodiments described above, and an embodiment obtained by appropriately combining features of the embodiments are included in the scope of the present invention without departing from the spirit of the present invention.

REFERENCE SIGNS LIST

First Embodiment

1, 1A . . . electric valve, 10 . . . valve body, 11, 11A . . . body member, 11*a* . . . first mounting hole, 11*b* . . . upper surface, 12 . . . flow channel block, 12*a* . . . second mounting hole, 12*b* . . . upper surface, 13, 13A . . . supporting member, 13*a* . . . valve stem hole, 13*c* . . . internal thread, 14 . . . valve chamber, 15 . . . valve port, 15*a* . . . upper end, 16 . . . valve seat, 16*a* . . . inner peripheral edge, 17 . . . flow channel, 18 . . . flow channel, 20 . . . can, 25 . . . connecting member, 30 . . . driving mechanism, 31 . . . magnet rotor, 31*d* . . . wall portion, 31*e* . . . wall portion, 33 . . . screw-feed mechanism, 34 . . . valve stem, 34*c* . . . external thread, 34*e* . . . coupling element, 40 . . . valve member, 45 . . . control portion, 46 . . . control surface, 47 . . . seating portion, 48 . . . seating surface, 50 . . . stator unit, 60 . . . stator, 60*a* . . . stator inner-circumferential surface, 61 . . . A-phase stator, 61*a* . . . pole tooth, 61*b* . . . pole tooth, 61*c* . . . coil, 62 . . . B-phase stator, 62*a* . . . pole tooth, 62*b* . . . pole tooth, 62*c* . . . coil, 63 . . . molded element, 64 . . . terminal supporting portion, 65 . . . terminal, 66 . . . stepping motor, 70 . . . housing, 70*a* . . . opening, 71 . . . peripheral wall portion, 71*a* . . . inner circumferential surface, 72 . . . upper wall portion, 72*a* . . . inner surface, 73 . . . connector, 74 . . . inner space, 75 . . . circuit board space, 76 . . . partition wall, 77 . . . lid member, 80 . . . controller, 90 . . . main circuit board, 100 . . . sub circuit board, 100*a* . . . first end, 100*b* . . . second end, 110 . . . magnetic sensor, 120 . . . microcomputer, 210 . . . storage unit, 220 . . . communication unit, 230 . . . rotation control unit, 400 . . . control unit, L . . . axis Second Embodiment

2 . . . electric valve, 10B . . . valve body, 13B . . . supporting member, 30B . . . driving mechanism, 31B . . . magnet rotor, 33B . . . screw-feed mechanism, 34B . . . valve stem, 37 . . . valve opening spring, 40B . . . valve member, 40*b* . . . upper end surface, 49 . . . spring receiving portion, 66B . . . stepping motor, 131 . . . first supporting portion, 132 . . . second supporting portion, 132*a* . . . valve stem hole, 132*c* . . . internal thread Third Embodiment

3 . . . electric valve, 10C . . . valve body, 13C . . . supporting member, 19C . . . bearing, 30C . . . driving mechanism, 31C . . . magnet rotor, 33C . . . screw-feed mechanism, 34C . . . valve stem, 40C . . . valve member, 40*a* . . . valve stem hole, 40*b* . . . upper end surface, 40*c* . . . internal thread, 66C . . . stepping motor

The invention claimed is:

1. An electric valve comprising:

a valve body that has a valve port and a valve seat enclosing the valve port;

a valve member that faces the valve port;

a valve stem;

a stepping motor; and a controller configured to control the stepping motor, wherein the valve stem and the valve body constitute a screw-feed mechanism, or the valve stem and the valve member constitute a screw-feed mechanism, wherein the valve stem is coaxially secured to a magnet rotor of the stepping motor, wherein an end of the valve stem is connected to the valve member, wherein when the magnet rotor rotates in a valve closing direction, the valve member moves toward the valve port, wherein when the valve member comes into contact with the valve seat, the valve seat restricts the valve member from moving toward the valve port, wherein, in an initialization operation mode, the controller is configured to input pulses to the stepping motor to rotate the magnet rotor in the valve closing direction and obtain, as a reference position, a position of the magnet rotor when rotation of the magnet rotor in the valve closing direction is restricted, wherein, in a normal operation mode, the controller is configured to position the magnet rotor based on the reference position and manage the position of the magnet rotor by using a number of pulses input to the stepping motor, wherein when the magnet rotor is at the reference position, inputting a maximum number of pulses to the stepping motor causes the magnet rotor to travel from the reference position to a full-open position, wherein a valve-member movement command received by the controller contains a valve opening degree corresponding to a target position of the magnet rotor, a valve opening degree of 0 [%] corresponds to the reference position, and a valve opening degree of 100 [%] corresponds to the full-open position, wherein the controller is configured to receive the valve-member movement command from an external device, wherein the controller is configured to rotate the magnet rotor to reach the position of the magnet rotor to the target position corresponding to the valve opening degree when the valve opening degree is greater than or equal to 0 [%] and less than or equal to 100 [%], wherein the controller is configured to transmit a command result indicating a reception of an out-of-range valve opening degree to the external device when the valve opening degree contained in the valve-member movement command received by the controller is less than 0 [%] or greater than 100 [%].

2. The electric valve according to claim 1, wherein the valve stem has an external thread, the valve body has an internal thread into which the external thread is screwed, and the screw-feed mechanism further includes the valve stem with the external thread and the valve body with the internal thread.

3. The electric valve according to claim 1, wherein the valve stem has an external thread, the valve member has an internal thread into which the external thread is screwed, and the screw-feed mechanism further includes the valve stem with the external thread and the valve member the internal thread.

4. The electric valve according to claim 2, wherein the valve body has a valve stem hole that is disposed coaxially with the valve port, wherein the internal thread is provided on an inner circumferential surface of the valve stem hole, and wherein the end of the valve stem is integrally connected to the valve member.

5. The electric valve according to claim 2, wherein the valve body has a valve stem hole that is disposed coaxially with the valve port, wherein the internal thread is provided on an inner circumferential surface of the valve stem hole, wherein the end of the valve stem is in contact with the valve member, and wherein when the magnet rotor rotates in the valve closing direction, the valve stem pushes the valve member toward the valve port.

6. The electric valve according to claim 3, wherein the valve body has a bearing that rotatably supports the valve stem, wherein the bearing is disposed coaxially with the valve port, wherein the valve member has a valve stem hole, and wherein the internal thread is provided on an inner circumferential surface of the valve stem hole.

7. The electric valve according to claim 1, wherein the controller includes a magnetic sensor that outputs a signal corresponding to the rotation of the magnet rotor, and wherein the controller detects that the rotation of the magnet rotor in the valve closing direction is restricted based on the signal output by the magnetic sensor.

8. The electric valve according to claim 1, wherein when the magnet rotor is at the reference position, inputting a maximum number of pulses to the stepping motor travels the magnet rotor from the reference position to a full-open position, wherein the controller stops rotating the magnet rotor when the magnet rotor is rotated in the valve closing direction and reaches the reference position, and wherein the controller stops rotating the magnet rotor when the magnet rotor is rotated in the valve opening direction and reaches the full-open position.

* * * * *